Figure 1:
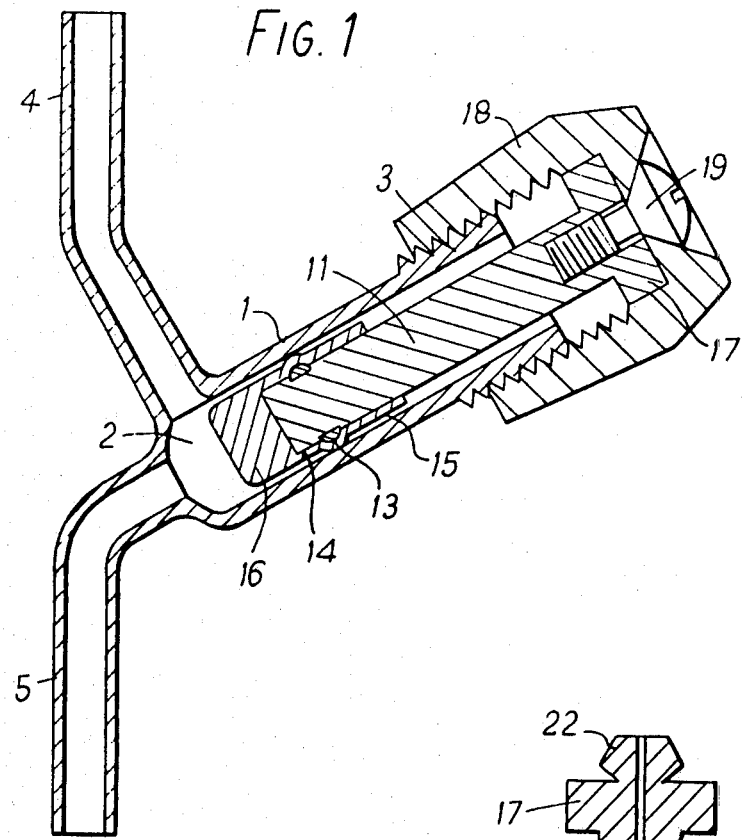

United States Patent [19]

Nightingale

[11] 4,268,472

[45] May 19, 1981

[54] VALVE

[75] Inventor: Douglas D. J. Nightingale, St. Albans, England

[73] Assignee: Imperial Chemical Industries Limited, London, England

[21] Appl. No.: 88,057

[22] Filed: Oct. 24, 1979

Related U.S. Application Data

[60] Division of Ser. No. 964,356, Nov. 28, 1978, which is a continuation of Ser. No. 617,510, Sep. 29, 1975, abandoned, which is a continuation of Ser. No. 482,983, Jun. 25, 1974, abandoned.

[30] Foreign Application Priority Data

Jul. 3, 1973 [GB] United Kingdom ............... 31564/73

[51] Int. Cl.$^3$ ............................................ B29C 13/00
[52] U.S. Cl. ................................ 264/230; 264/342 R; 264/DIG. 71; 264/DIG. 76; 137/175; 251/324
[58] Field of Search ............... 251/172, 175, 214, 324, 251/309; 137/375; 92/249, 194, 195; 264/230, 127, DIG. 71, 342 R, DIG. 76, 234, 237, 292

[56] References Cited

U.S. PATENT DOCUMENTS

| | | | |
|---|---|---|---|
| 3,062,496 | 11/1962 | Stahlin | 251/324 X |
| 3,182,568 | 5/1965 | Davis | 92/194 |
| 3,544,672 | 12/1970 | Goda | 264/230 |
| 3,589,677 | 6/1971 | Segers | 137/375 |
| 3,747,479 | 7/1973 | Nightingale et al. | 251/214 X |

Primary Examiner—Alan Cohan
Attorney, Agent, or Firm—Cushman, Darby & Cushman

[57] ABSTRACT

A valve especially suitable as a relatively cheaply manufactured means for controlling liquids in laboratory equipment, comprises a body having a valve seat with a flow passage passing through the seat, and a spindle located within the body; the spindle comprising a mandrel having an annular groove, a resilient annulus located in the annular groove, and an inert sheath fitted closely over the surface of an end portion of the mandrel and overlying the resilient annulus, the sheath having a closed end shaped to engage the seat for occlusion thereof and having overlying the resilient annulus an annular sealing portion standing proud of the surface of the rest of the sheath, the annular sealing portion being biased against the surrounding body to form a sliding gland seal. The sheath may be preformed or moulded in situ, and protects the mandrel and resilient annulus from attack by fluids flowing through the valve.

1 Claim, 4 Drawing Figures

VALVE

This is a division of application Ser. No. 964,356, filed Nov. 28, 1978 as a continuation of application Ser. No. 617,510, filed Sept. 29, 1975, now abandoned, as a continuation of application Ser. No. 482,983, filed June 25, 1974, now abandoned.

The invention relates to valves for the control of fluid flow, and especially to valve spindles which can be easily and cheaply manufactured for controlling liquids in laboratory equipment such as burette taps.

According to the invention there is provided a valve for the control of fluid flow, comprising a body having a valve seat with a flow passage passing through the seat, and a spindle located within the body; the spindle comprising a mandrel having an annular groove, a resilient annulus located in the annular groove, and an inert sheath fitted closely over the surface of an end portion of the mandrel and overlying the resilient annulus, the sheath having a closed end shaped to engage the seat for occlusion thereof and having overlying the resilient annulus an annular sealing portion standing proud of the surface of the rest of the sheath, the annular sealing portion being biased against the surrounding body to form a sliding gland seal.

The end portion of the mandrel over which the sheath is closely fitted, preferably has a cylindrical surface so as to provide good support for the sidewall of the sheath while minimising dead space between the valve body and the spindle.

In one preferred form of the valve, the resilient annulus of the spindle is an O-ring having an external diameter greater than that of the mandrel so that in overlying the O-ring, an annular portion of the sheath is caused to stand proud of the surface of the rest of the sheath. Such a spindle may be manufactured by locating an O-ring in an annular groove around a mandrel, and inserting the mandrel and O-ring into a sheath whose internal diameter is less than or equal to the diameter of the mandrel. The diameter of the O-ring being greater than that of the mandrel, it distends outwards an annular portion of the sheath slid over it so that the annular portion stands proud of the rest of the sheath surface. By distending the sheath in this manner, the O-ring is not only able to bias the annular portion of the sheath against the valve body to form the gland seal, but also provides a means for retaining the sheath on the end portion of the mandrel.

An alternative method for forming the spindle on such a valve is to injection mould the sheath onto the mandrel and O-ring, for example by injection moulding a thermoplastic material, the mould being shaped so that the sheath follows the contour of the mandrel and the O-ring whereby the annular portion of the sheath overlying the O-ring is moulded to stand proud of the rest of the surface. However when injection moulding a sheath over the mandrel and proud O-ring from one end of the spindle, there is a tendency when using a wide groove, for the O-ring to be pushed to the back of the groove and the front of the groove filled with the moulding composition. This is generally a disadvantage in that it tends to reduce the resilience of the bias of the annular sealing portion against the valve body. It is therefore preferred to match the sizes of the O-ring and its retaining groove so that the O-ring is a close fit within the groove to seal the groove against ingression of the sheath-forming material during the moulding of the sheath around the mandrel and O-ring.

The above build up of moulding composition is aggravated by the O-ring standing proud of the mandrel surface, and may be reduced by making the resilient annulus lie flush with or below the level of the mandrel surface. An alternative form of valve which makes use of this fact, and which is accordingly particularly suited to having its sheath formed in situ by injection moulding, is one in which the surface of the resilient annulus lies flush with or below the level of the mandrel surface, and the sheath has an upstanding annular ridge formed thereon, the ridge overlying the resilient annulus and providing the proud annular sealing portion.

In all these spindles, whether formed by using a preformed sheath having an annular portion distended by an O-ring or formed by moulding the sheath in situ, it is preferable to provide means for retaining the sheath on the mandrel. Whether this is strictly necessary depends partly on the materials used for the sheath, O-ring and mandrel, and partly on the pressure gradient across the gland seal when the valve is in use. Thus for example, when using materials with very low coefficients of friction for the sheath (e.g. PTFE), or where there is to be a much lower pressure within the valve than without (e.g. in evacuated equipment) the provision of specific retaining means becomes more important. Under the reverse conditions, the friction between the sheath and the mandrel may be sufficient to retain the sheath. For conditions of low pressure differential, such as may usually be found in a burette tap for example, the outward distension of the sheath by a proud O-ring, may be the only means required for retaining the sheath on the mandrel. Where other retaining means are required, these may suitably include means to key the sheath to the mandrel. These are most easy to obtain in spindles wherein the sheath is moulded in situ, by providing further depressions (such as another annular groove) in the surface of the spindle and moulding into the depression a key integral with the remainder of the sheath.

In all forms of the present valve, the sheath isolates the mandrel and resilient annulus from any fluid flowing through the valve. Both the mandrel and the resilient annulus may therefore be formed from the physically most appropriate material without any considerations being necessary of what fluid is to flow through the valve and whether it might corrode such materials. Suitable materials include for example brass or glass-filled nylon for the mandrel and rubber for the resilient annulus. The material used for the sheath, however, needs to be inert with respect to the fluid since the fluid and sheath will be in contact during usage of the valve. Materials which may be suitable for forming the sheath include for example, nylon and polyolefines. However, because of this inertness to a wide spectrum of chemical compounds, fluorine-containing polymers are generally preferred. These also have the advantage of low coefficients of friction which facilitate operation of the valves. Of the fluorine-containing polymers, polytetrafluoroethylene-hexafluoropropylene copolymers (FEP) may be used to preform a sheath or to injection mould a sheath in situ, and polytetrafluoroethylene (PTFE) is particularly suitable for preformed sheaths.

Figure 2:
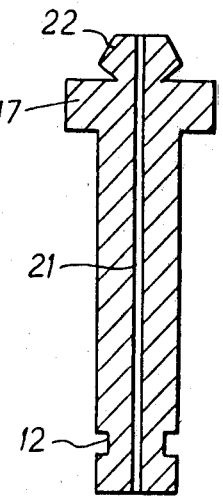
Figure 3:
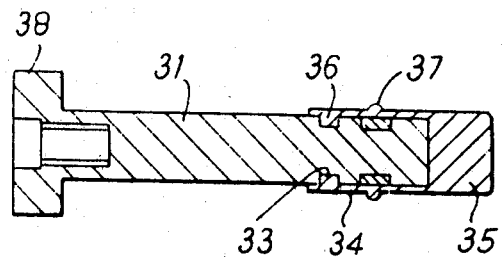
Figure 4:
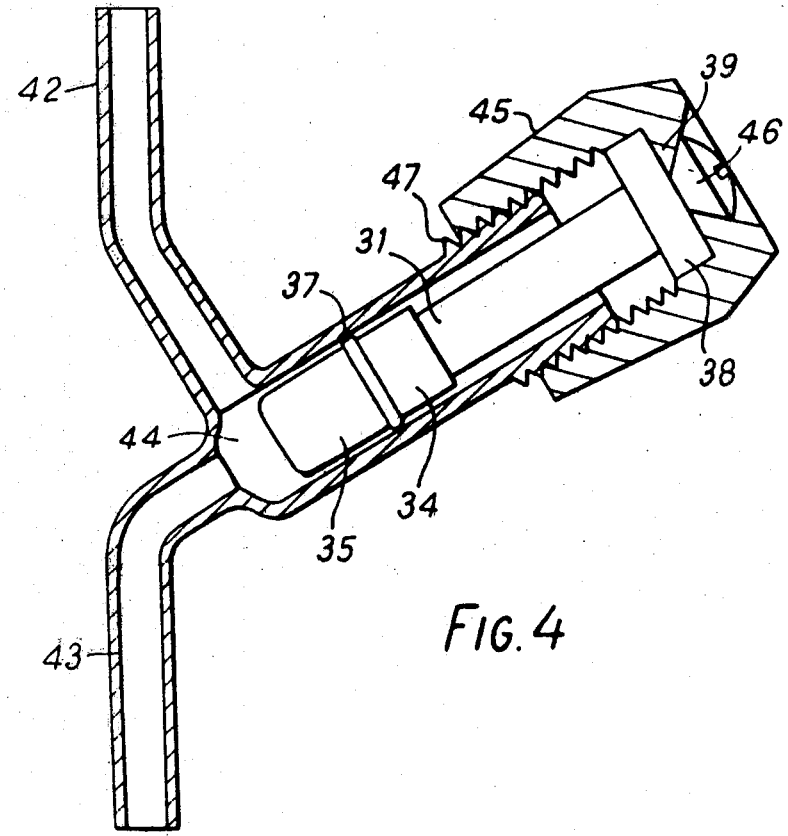

The invention is illustrated by specific embodiments of both forms of the invention shown by way of example in the drawings, in which FIG. 1 is a section through a burette tap in which the spindle was formed using a preformed sheath, FIG. 2 is a section through a mandrel having alternative features, and which is suitable as a replacement spindle for the tap of FIG. 1, FIG. 3 is a section through a valve spindle having a sheath formed by in situ injection moulding, and FIG. 4 is a section through a burette tap like that of FIG. 1 but incorporating a spindle (not sectioned) as shown in FIG. 3.

The valve shown in FIG. 1 has a glass body comprising a stem 1 having a smooth surfaced bore and with a valve seat 2 at one end. The other end of the stem is externally threaded 3. Inlet and outlet arms 4 and 5 open into the bore of the stem, one via the valve seat. The valve spindle has a mandrel 11 having a unitary end portion having a cylindrical surface with an annular groove 12 in the surface. Within the groove is located a resilient annulus in the form of a rubber O-ring 13, whose outer peripheral part stands proud of the cylindrical surface of the mandrel. Enclosing the end of the mandrel is a close fitting PTFE sheath 14 having thin sidewalls 15 and a more massive closed end 16 shaped to engage the valve seat 2. At the other end, the mandrel has two lugs 17, and mounted on the end of the mandrel is a cap 18 having slots to receive the lugs 17. The cap is retained in place by a screw 19.

In assembling the spindle, the O-ring 13 was first slipped over the end of the mandrel until it was located in the groove 12. While holding the closed end of the sheath by hand, the sidewalls defining the open end of the sheath were warmed gently to expand them, and while still warm they were pushed over the mandrel and O-ring until the mandrel was touching the closed end portion of the sheath, or nearly so. The cap 18 was then placed on the end of the mandrel and secured in place by the screw 19. On insertion of the spindle into the bore of the stem so that the cap threads engaged those of the body 2, the assembly of the valve was complete, and the valve was ready to be incorporated into laboratory apparatus. The valve was then operable in known manner by rotation of the cap, which by its screw-threaded engagement of the valve body moved the spindle axially towards or away from the valve seat 2.

An annular portion of the sidewalls of the sheath was distended outwards by the O-ring and pressed against the internal surface of the bore of the stem thereby providing the gland seal of the valve. When viewed from outside, that is through the glass valve body, the appearance of the seal was that of an annulus of about 1 mm in width wherein the glass looked as though it was wetted by the PTFE where this was pressed against it by the O-ring.

PTFE is the material preferred for a preformed sheath of this kind because of its well known chemical inertness and low coefficient of friction. However, we find it also possesses physical properties which are very well suited to this application. Thus it is sufficiently resilient to provide adequate closure of the valve seat and to follow minor variations in the bore wall when forming the annular gland seal. Our previous experience with such low friction materials when testing a similar structure for the use as a piston exposed to high vacuum, was that during operation the sheath tended to be sucked off the end of the mandrel unless positively secured in some manner. However, we now find surprisingly that with the more limited movements which are usually found in valve operation, the sheath may be retained with quite adequate tenacity for many laboratory applications without the provision of further retaining means.

We made up several valves of different sizes, all essentially of the same shape as that illustrated. The valves tested had bore diameters ranging from 7.16 mm (0.282 inch) to 25.40 mm (1.00 inch), this range being selected as covering the majority of commonly used laboratory glassware. All had PTFE sheaths fitted onto glass-filled nylon mandrels having annular grooves 0.94 mm±0.04 mm (0.037±0.0015 inch) deep and 2.03 mm (0.080 inch) wide with rubber O-rings having a 1.78 mm (0.070 inch) thickness. In respect of these materials and dimensions, we found that the internal diameter of the sheath was preferably equal to or less than the diameter of the mandrel before assembly, for adequate retention of the sheath in applications such as burette taps, but for more arduous conditions, it is preferable to use a sheath of smaller internal diameter. A mandrel having a diameter of 1 to 3% greater than the internal diameter of the sheath before assembly is more generally to be preferred. The sidewall of the PTFE sheath where it overlies the O-ring, preferably has a thickness less than 0.63 mm (0.025 inch) thick because thicker PTFE walls were found to grip the O-ring less firmly. With sidewall thicknesses below 0.3 mm (0.012 inch), the sheaths became difficult to handle and so it is preferred to use sheaths in which the sidewalls are at least 0.3 mm (0.012 inch) thick. Most suitable internal diameters for standard rubber O-rings of nominal thickness 1.78 mm (0.070 inch) are 80–90% of the mandrel diameter at the base of the groove.

A valve shaped substantially as illustrated in FIG. 1 was tested to find the efficiency of the gland seal produced by the annular portion of the PTFE sheath which is pressed against the bore of the valve body. The valve had the following dimensions: bore diameter 7.16 mm (0.282 inch), PTFE sheath outside diameter 6.86 mm (0.270 inch), sheath sidewall thickness 0.51 mm (0.020 inch), thickness of the O-ring 1.78 mm (0.070 inch), internal diameter of the O-ring 3.68 mm (0.145 inch) and diameter of the mandrel at the base of the groove 3.81 mm (0.150 inch). The test was carried out by using a well known technique in which the article is connected to a large evacuated vessel and the time taken for the pressure to rise between two specified pressures is measured. In the present test, one arm of the valve was sealed while the other arm was connected to a 1 l vessel, the valve being in the open position. The vessel was provided with means to evacuate it and a Pirani gauge to measure the pressure in it. After normal degassing procedures, the gland seal formed in the stem was found to have a leak rate better than $5\times10^{-7}$ torr $dm^3s^{-1}$ when the pressure within the vessel rose from $10^{-4}$ to $2\times10^{-4}$ torr.

The O-ring used in the valve subjected to the above leak rate tests was a standard size presently commercially available. This thickness of 1.78±0.08 mm (0.070±0.003 inch) is generally suitable for most applications found in normal laboratory apparatus. Other thicknesses currently available are 2.62 mm (0.103 inch) and 3.53 mm (0.139 inch), and these may be used where the other dimensions permit. Thus although good seals might be producible with the larger thicknesses even on small valves, an excessive depth of groove would weaken the mandrel and be unsuitable for mechanical considerations. In general, therefore, standard 1.78 mm (0.070 inch) thick O-rings are preferred for valves in laboratory apparatus. The O-ring used in the above tests had a circular cross-section, these being more generally available, but O-rings having other cross-sectional shapes appear to give good results also.

The valve was designed as a simple valve, suitable for controlling liquid flow through laboratory glassware, with the intention that it should be reasonably cheap to mass produce commercially. Accordingly a design requiring only a small quantity of the relatively expensive PTFE has been provided, and no provision for adjusting the outward distension has been made in order to reduce the number of parts to be made and assembled. Hence although the resilience of the O-ring allows a small amount of tolerance in the diameter of the bore of the stem the size of the annular distended portion should be matched to the bore diameter. In practice for controlling liquid flow at ambient pressures, e.g. in a burette, the lack of precision on standard tubing sizes does not usually provide any problems, and, as the above results show, where the sizes are suitably matched, it is possible to obtain an extremely good seal even with high pressure differentials across the seal. However where temperature cycling is required, especially with a high pressure differential across the gland seal, it is preferred to replace the spindle of the present invention with a more sophisticated adjustably-distensible spindle, e.g. as described in British Pat. No. 1,157,620.

It is not essential to use PTFE for the sheath, and thermoplastic materials in particular are readily formed into very cheap sheaths, but too flexible a material may not be sufficiently stiff to be retained in place solely by the distension due to the O-ring. For example we have made an experimental valve having dimensions similar to those of the valve specifically described hereinabove and whose leak rate measurements have been described, in which the PTFE sheath was replaced by a polypropylene sheath. The sheath was retained satisfactorily and provided an adequate gland seal. This valve was stiffer to operate than the one using PTFE, but because of the low gearing provided by the screw cap illustrated, it was fully satisfactory in use.

Using a two part mould having a cylindrical chamber with an annular channel part way along its length, we have also made valve spindles by injection moulding a sheath over a mandrel and O-ring. The mandrel and O-ring were as shown in FIG. 1 except that the mandrel had a step on the side of the O-ring remote from the nose, the step increasing the radius by the thickness of the sheath. The mandrel and O-ring were then placed into the mould with the O-ring located in the plane of the annular channel of the mould. Polypropylene was injected into the mould from the spindle nose end and formed an even layer over the mandrel and O-ring up to the shoulder. Hence, just as the O-ring stood proud of the mandrel, the even layer of the sheath by following the contours of the mandrel and O-ring, likewise had an annular portion standing proud of the rest. Although some flash was visible where the two mould parts met, the proud sealing portion of this spindle also appeared to "wet" the glass evenly around the circumference, and the resultant burette tap was found to behave in a manner very similar to that using the preformed polypropylene sheath described hereinabove.

FIG. 2 shows in section a mandrel having two independent features not shown in FIG. 1, each of which can be advantageously incorporated. These are an air bleed tube 21 and an undercut boss 22 at the cap end of the mandrel. The other features which are common to FIG. 1 have been given like numerals. The air bleed tube is a tube for connecting the end of the mandrel enclosed by the sheath, with the atmosphere, so that during assembly the trapped air may escape more easily than it does past the O-ring. It is generally most convenient to have an axial tube as shown, but provided it enables air to escape it can take alternative paths. The undercut boss is provided to receive the cap with a snap action. The cap may be the same as that used in FIG. 1, and the snap fit avoids the need for the screw 19, which would otherwise require the mandrel to be bored and tapped to receive the screw.

The shoulders 17 are provided to prevent rotation of the mandrel with respect to the cap. In most cases this is not essential, and normally the spindle may be made free to slide along the bore without rotational movement corresponding to that of the cap when the latter is rotated to provide the axial movement by its threaded engagement with the valve stem. Where rotation of the mandrel is not essential, the shoulders may be omitted.

An alternative form of valve to that illustrated which is also found in laboratory glassware, is one in which the two arms (equivalent to the illustrated arms 4 and 5) are aligned, and the valve stem which contains the spindle is perpendicular to them. The valve is then closed by inserting the spindle between the two tubes so that they are both closed simultaneously by the sides of the spindle. However, to be efficient, such valves tend to be more expensive because the seating to receive the spindle on closure requires accurate forming, and is generally more expensive to produce than a seat formed at the mouth of a single arm coaxial with the spindle and aligned so as to be closable by the end of the spindle, as shown in FIG. 1. The latter valve having the single arm closable is therefore preferred where a cheap valve is required.

The spindle of FIG. 3 comprises a mandrel 31 moulded from glass-filled nylon, and inset into an annular groove around the mandrel is an annulus 32 of rubber whose surface is flush with the surface of the mandrel. Adjacent the annulus 32 is a further annular groove 33. Around the end of the mandrel is a sheath 34 which was injection moulded in situ from polypropylene, the closed end of the sheath being shaped to form a massive nose 35, and at its end remote from the nose, the polypropylene has flowed during moulding into the groove 33 to form a key 36. Around the spindle and overlying the annulus 32, is a ridge 37. The end of the spindle remote from the sheath is axially drilled and tapped and has a shoulder 38 extending outwards on both sides.

In FIG. 4, the spindle is shown located inside a valve body 41, having two arms 42,43, and a valve seat 44. A cap 45 is secured to the spindle by a screw 46 and fits closely over the two shoulders 38. The cap is threaded and engages threads 47 on the body, so that when the cap is rotated the spindle nose moves towards or away from the seat 44. Closure of the valve is effected by moving the spindle nose 35 into engagement with the seat 44. The internal diameter of the valve body was 0.415 inch and the diameter of the spindle ridge was 0.430 inch, so that when the spindle was inserted into the valve body, the ridge was forced inwards against the bias of the rubber annulus 32 which therefore constantly urged the ridge outwards against the valve body to form the gland seal. The purpose of the gland seal is to prevent any fluid flowing through the valve from escaping along the side of the spindle towards the cap, and hence the sheath 34 in extending from the glandseal-forming ridge and around the nose of the spindle as a continuous layer, effectively isolates the mandrel and its annulus from the fluid whose flow is being controlled.

I claim:

1. A method for the production of a spindle for a fluid flow control valve comprising a body having a valve seat with a flow passage passing through the seat and a spindle slideable within the valve body to bring one end into engagement with the valve seat for occluding the flow passage during operation of the valve, the method comprising forming a mandrel with an end portion thereof having a substantially cylindrical surface with an annular groove therearound, locating in said annular groove a resilient annulus having an external diameter greater than that of the cylindrical surface, shaping a sheath from polytetrafluoroethylene to comprise side walls and an integral closed end shaped to engage the valve seat for occlusion of the flow passage therethrough, the side walls being formed with an internal diameter less than or equal to the external diameter of the cylindrical surface of the mandrel, warming at least the side walls of the sheath until they are able to receive the mandrel and resilient annulus therewithin, and sliding the warm sheath over the end of the mandrel until the side walls extend over the resilient annulus;

whereby on cooling, the sheath conforms to the shape of the mandrel's cylindrical surface to form a raised annular ridge which in the assembled valve is biased against the valve body by the resilient annulus to thereby form a gland seal for preventing loss of fluid from the flow passage.

* * * * *